United States Patent
Ngo (10) Patent No.: US 6,584,100 B1
(45) Date of Patent: Jun. 24, 2003

(54) SYSTEM FOR ESTABLISHING A TRANSMISSION SEQUENCE FOR PLURAL TERMINALS IN A WIRELESS NETWORK

(75) Inventor: Chiu Y. Ngo, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/193,435

(22) Filed: Nov. 17, 1998

(51) Int. Cl.$^7$ ............................... H04J 3/17; H04J 3/16
(52) U.S. Cl. ..................... 370/377; 370/336; 370/338; 370/345; 370/346; 370/458
(58) Field of Search ............................. 370/235, 329, 370/336, 337, 338, 345, 346, 347, 348, 349, 431, 442, 458, 459, 462, 464, 465, 498, 912, 913, 915; 455/500, 507, 509

(56) References Cited

U.S. PATENT DOCUMENTS

| | | | |
|---|---|---|---|
| 5,493,569 A | * 2/1996 | Buchholz et al. | 370/85.7 |
| 5,506,848 A | * 4/1996 | Drakopoulos et al. | 370/95.1 |
| 5,684,791 A | 11/1997 | Raychaudhuri et al. | 370/278 |
| 5,719,868 A | * 2/1998 | Young | 370/436 |
| 5,764,734 A | * 6/1998 | Medendorp et al. | 379/90.01 |
| 5,787,080 A | * 7/1998 | Hulyalkar et al. | 370/348 |
| 5,949,760 A | * 9/1999 | Stevens et al. | 370/254 |
| 6,285,892 B1 | * 9/2001 | Hulyalkar | 455/574 |

FOREIGN PATENT DOCUMENTS

| | | |
|---|---|---|
| WO | 9721285 A1 | 6/1997 |
| WO | 9747112 A2 | 12/1997 |

OTHER PUBLICATIONS

A. Ganz and Y. Gao. Efficient Algorithms for SS/TDMA Scheduling. IEEE Transactions on Communications, vol. 40, No. 8, Aug. 1992. pp. 1367–1374.*

PHA 23,206, U.S. patent application Ser. No. 08/770,024, Filed: Dec. 19, 1996.

PHA 23,443, U.S. patent application Ser. No. 09/107,526, Filed: Jun. 30, 1998.

"A Contention–Based Reservation Protocol using a TDD Channel for Wireless Local Area Networks: A Performance Analysis", by Suzuki et al, IEEE International Conf. May 23–26, 1993, Geneva Switzerland, pp. 1010–1016.

"Wireless ATM Radio Access Layer Requirements", by D. Gilmurray et al., ATM Forum Technical Committee, pp. 1–8.

* cited by examiner

*Primary Examiner*—Hassan Kizou
*Assistant Examiner*—Joe Logsdon
(74) *Attorney, Agent, or Firm*—Daniel J. Piotrows (57) ABSTRACT

The system establishes a transmission sequence for effecting communications between plural terminals in a wireless network. This transmission sequence is defined by a control data frame comprised of plural slots, each of which can be allocated for communication between one pair of the plural terminals. In operation, the system begins by generating a transmit/receive matrix for the plural terminals in the wireless network. This transmit/receive matrix includes plural rows and plural columns, where each of the plural rows corresponds to a terminal and each of the plural columns corresponding to a same or different terminal. At each row/column nexus, the transmit/receive matrix includes an entry which indicates whether communications are to be effected between a pair of terminals that corresponds thereto. Slots in the control data frame are then allocated to pairs of the plural terminals based on these entries in the transmit/receive matrix.

38 Claims, 9 Drawing Sheets

| i\j | 1 | 2 | 3 | 4 |
|---|---|---|---|---|
| 1 | o | x | x | x |
| 2 | x | o | x | x |
| 3 | x | x | o | x |
| 4 | x | x | x | o |

| i\j | 1 | 2 | 3 | 4 |
|---|---|---|---|---|
| 1 | 0 | 0 | 0 | 0 |
| 2 | 0 | 0 | 1 | 0 |
| 3 | 0 | 0 | 0 | 1 |
| 4 | 0 | 0 | 1 | 0 |

| i\j | 1 | 2 | 3 | 4 |
|---|---|---|---|---|
| 1 | 0 | 0 | 0 | 1 |
| 2 | 1 | 0 | 0 | 1 |
| 3 | 0 | 1 | 0 | 1 |
| 4 | 0 | 0 | 1 | 0 |

FIG. 8

| i \ j | 1 | 2 | 3 | 4 |
|---|---|---|---|---|
| 1 | 0 | 0 | 0 | 1 |
| 2 | 1 | 0 | 0 | 1 |
| 3 | 0 | 1 | 0 | 1 |
| 4 | 0 | 0 | 0 | 0 |

| i \ j | 1 | 2 | 3 |
|---|---|---|---|
| 1 | 0 | 0 | 0 |
| 2 | 1 | 0 | 0 |
| 3 | 0 | 0 | 0 |
| 4 | 0 | 0 | 0 |

| i \ j | 1 | 2 | 3 | 4 |
|---|---|---|---|---|
| 1 | 0 | 0 | 0 | 1 |
| 2 | 0 | 1 | 0 | 1 |
| 3 | 0 | 0 | 0 | 1 |
| 4 | 0 | 0 | 0 | 0 |

|   | j=1 | j=2 | j=3 | j=4 |
|---|---|---|---|---|
| i=1 | o | x | x | x |
| i=2 | x | o | o | o |
| i=3 | x | o | o | o |
| i=4 | x | o | o | o |

FIG. 14

|   | j=1 | j=2 | j=3 | j=4 |
|---|---|---|---|---|
| i=1 | o | o | o | o |
| i=2 | o | o | o | o |
| i=3 | o | o | o | o |
| i=4 | o | o | o | o |

FIG. 16

SYSTEM FOR ESTABLISHING A TRANSMISSION SEQUENCE FOR PLURAL TERMINALS IN A WIRELESS NETWORK

BACKGROUND OF THE INVENTION

1. Field of the Invention

The present invention is directed to a system for establishing a transmission sequence by which terminals in a wireless network communicate. In particular, the invention is directed to a system which generates a matrix identifying which terminals are to transmit and/or receive data, and which uses entries in that matrix to establish a transmission sequence with a reduced number of one-slot transition turnarounds in the wireless terminals. The invention has particular utility in connection with the medium access control protocol for wireless ATM networks, in which the transmission sequence for wireless terminals is defined by slots in a control data frame.

2. Description of the Related Art

ATM ("asynchronous transfer mode") is a protocol which was developed to address problems associated with transmitting multimedia data between networked devices. In particular, ATM networks are systems that negotiate and establish transmission parameters (e.g., bandwidth) prior to connecting two networked devices, "packetize" different types of data (e.g., video and audio data) into cells based on the established transmission parameters, and then multiplex these cells so that they can be transmitted over a single communication line to a receiving device. The receiving device then checks the transmitted data for errors and, if any are present, requests retransmission of the data by the transmitting device.

Traditionally, ATM networks were wire-based, meaning that devices therein were interconnected using fiber optic cables or the like. Recently, however, wireless ATM networks have been developed which replace at least some of these fiber optic cables with point-to-point wireless connections, such as radio-frequency ("RF") and infrared ("IR") links. A wireless ATM network of this type is described in U.S. patent application Ser. No. 08/770,024, entitled "Medium Access Control (MAC) Protocol For Wireless ATM", the contents of which are hereby incorporated by reference into the subject application as if set forth herein in full.

Figure 1:
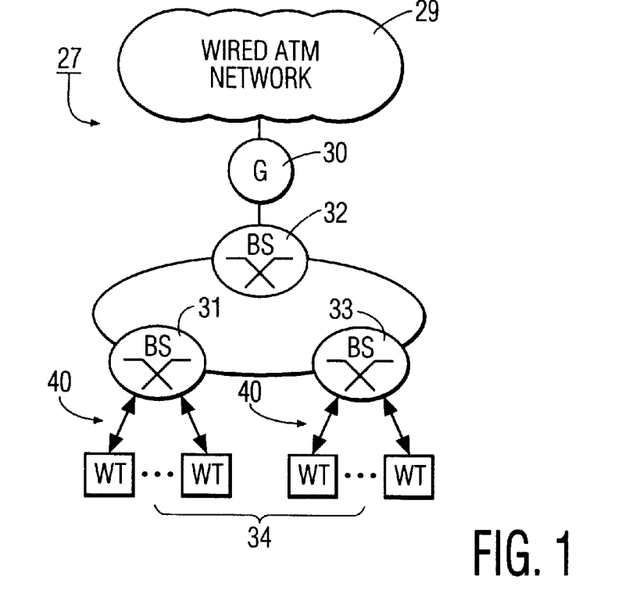
FIG. 1 shows a network on which the present invention may be implemented, which has a base station architecture and a tree topology.
Figure 2:
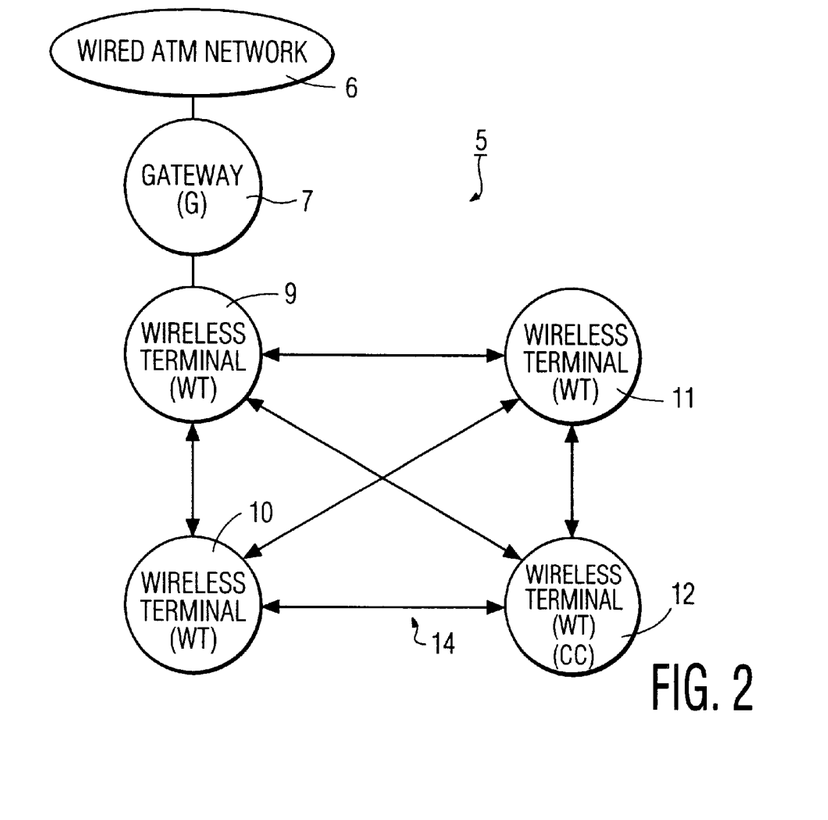
FIG. 2 shows another network on which the present invention may be implemented, which has an ad-hoc architecture.

In detail, the foregoing U.S. patent application describes a communications protocol (i.e., the MAC protocol) for wireless ATM networks, which increases network quality of service, particularly in terms of allocated bandwidth, by first reserving and then scheduling resources required for data transmission. FIGS. 1 and 2 show different configurations of wireless ATM networks on which the MAC protocol is implemented. Specifically, FIG. 1 shows a "base station" configuration, in which base stations (or "BSs") control communications among various wireless terminals (or "WTs"), and FIG. 2 shows a so-called "ad-hoc" configuration in which one of the wireless terminals is assigned the task of controlling communications (i.e., the central controller, or "CC").

Figure 3:
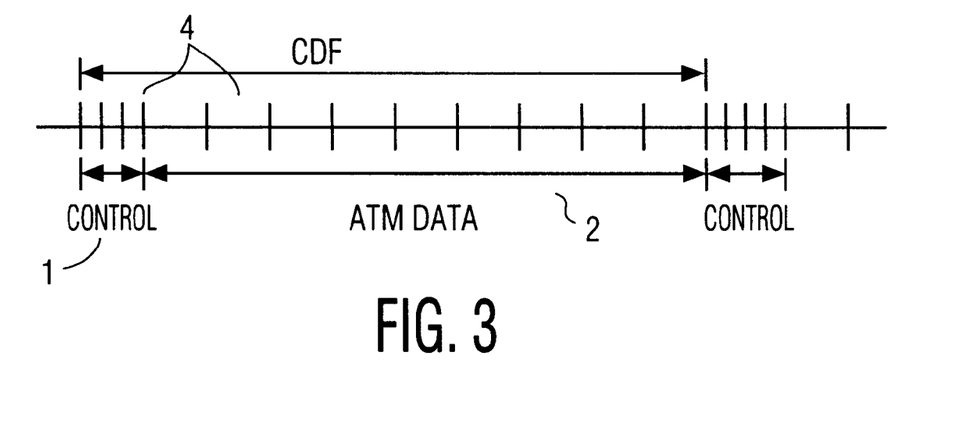
FIG. 3 shows a control data frame used with the MAC protocol.

In both the base station and ad-hoc configurations, communications among the various wireless terminals are effected via a time-slot based control data frame ("CDF"). As shown in FIG. 3, this CDF includes both a control phase 1 and a data phase 2, each of which includes plural slots 4 for transmitting requests or data to/from various wireless terminals. Specifically, in the control phase, a wireless terminal sends a request to a scheduler in a base station or central controller via a control slot in the CDF. Generally speaking, this is a request for permission for the wireless terminal to transmit data packet(s) to another wireless terminal during the data phase of a next CDF. The scheduler gathers all such requests from the wireless terminals, and then allocates available data slots in the data phase of the next CDF to appropriate pairs of wireless terminals. That is, the scheduler allocates each data slot to a transmit/receive terminal pair, such that the transmitting terminal is permitted to send data in a particular data slot and the receiving terminal is permitted to receive the data from that data slot. Once these allocations are made, they are broadcast to the various wireless terminals, thereby informing each wireless terminal which data slots in the next CDF it can use to transmit/receive data.

In MAC-based wireless ATM networks of the type described above, all wireless terminals typically operate on the same frequency. As a result, it is not possible to switch a wireless terminal from a transmitting mode to a receiving mode without some time delay. This delay, which is commonly referred to as the minimum transceiver turnaround time ("MINTAT"), needs to be taken into account when determining the transmission sequence by which wireless terminals in the network communicate. Specifically, in order to reduce a degradation in network performance resulting from the MINTAT, slots in the CDF should be allocated so that each wireless terminal has enough time (at least the MINTAT) to switch from its transmitting mode to its receiving mode without adding additional delay into the network. To this end, when designing a transmission sequence, it is thus desirable to avoid situations where a wireless terminal changes from its transmitting mode to its receiving mode in adjacent slots of a CDF. This "one-slot transition turnaround" (or "OTT") as it is called, results in additional networks delays and, therefore, should be avoided (or minimized) whenever possible.

Conventional systems reduce the number of OTTs during a transmission sequence by using dynamic programming or conventional back-tracking techniques, such as the "branch and bound" method. In brief, the branch and bound method is performed by generating a plurality of groups of transmission sequences for a single CDF. These groups are then divided into two sub-groups, from which the better of the two sub-groups (i.e., the sub-group which includes the fewest OTTs) is selected. Thereafter, the selected sub-group is then divided into two sub-sub-groups, from which the better of the two is selected, and so on until the best transmission sequence is selected. The problem with methods of this type is that they are computationally intensive, and become even more so as the number of communications per transmission sequence increase.

In response to the deficiencies of the foregoing methods, heuristic methods were developed for establishing a transmission sequence with relatively few OTTs. However, these heuristic methods have proven unsatisfactory for a number of reasons. For example, conventional heuristic methods have, heretofore, been unable to reduce the number of OTTs per transmission sequence to a satisfactory level. Moreover, these methods are often difficult to implement and can be computationally intensive.

Accordingly, there exists a need for a system which establishes a transmission sequence for terminals in a wireless network, which reduces the number of OTTs per transmission sequence, and which is less computationally intensive than its conventional counterparts. In particular, there exists a need for a system which allocates slots in a control data frame of a wireless ATM network running the MAC protocol so as to achieve these and other advantages.

SUMMARY OF THE INVENTION

The present invention addresses the foregoing needs by allocating slots in a CDF based on entries in a transmit/receive matrix. In particular, the invention generates a transmit/receive matrix which includes rows of terminals and columns of terminals. At each row/column nexus is an entry which defines whether communications are to be effected between a pair of terminals corresponding to that entry. The invention uses these entries to select the order in which pairs of terminals are to appear in the CDF. By establishing a transmission sequence in this manner, the invention is able to reduce the number of OTTs to two or less in most cases, and to do so using relatively simple calculations. Thus, unlike its conventional counterparts, the invention is able to reduce network degradation relatively easily.

Thus, according to one aspect, the present invention is a system (e.g., a method, an apparatus, and computer-executable process steps) for establishing a transmission sequence for effecting communications between plural terminals in a wireless network. This transmission sequence is defined by a CDF comprised of plural slots, each of which can be allocated for communication between one pair of the plural terminals. In operation, the system begins by generating a transmit/receive matrix for the plural terminals in the wireless network. This transmit/receive matrix includes plural rows and plural columns, where each of the plural rows corresponds to a terminal and each of the plural columns corresponds to a same or different terminal. At each row/column nexus, the transmit/receive matrix includes an entry which indicates whether communications are to be effected between a pair of terminals that corresponds thereto. Slots in the CDF are then allocated between pairs of the plural terminals based on these entries in the transmit/receive matrix.

According to another aspect, the invention is a system for using a transmit/receive matrix to allocate data slots in a control data frame to pairs of terminals, where the transmit/receive matrix is comprised of plural rows and plural columns. Each of the plural rows corresponds to a terminal and each of the plural columns corresponds to a terminal. The transmit/receive matrix includes an entry at each row/column nexus, each entry comprising either a one to indicate that communications are to be effected between a pair of the terminals that corresponds to the entry or a zero to indicate that communications are not to be effected between a pair of terminals that corresponds to the entry.

In operation, the system (A) selects an entry $(i_0, j_0)$ in the transmit/receive matrix which has at least one of a minimum non-zero row sum and a minimum non-zero column sum, where "i" represents a row number and "j" represents a column number, and (B) allocates a first available data slot in the control data frame to a pair of terminals that corresponds to entry $(i_0, j_0)$ in the transmit/receive matrix. The system then (C) searches row $i_0$ for non-zero entries with increasing column sums, (D) allocates succeeding data slots in the control data frame to pairs of terminals that have non-zero entries in row $i_0$ with increasing column sums, and (E) sets, to zero, non-zero entries in row $i_0$. Next, the system (F) searches column $j_L$ for a non-zero entry with a minimum row sum, where column $j_L$ comprises a last column in row $i_0$ having a highest non-zero column sum.

In a case that a non-zero entry with a minimum row sum is found in column $j_L$ the system (i) allocates a next succeeding data slot in the control data frame to a pair of terminals that has a non-zero entry in column $j_L$ with a minimum row sum, (ii) sets, to zero, the non-zero entry in column $j_L$ with the minimum row sum, and (iii) repeats at least steps (B) through (F) above substituting the non-zero entry in column $j_L$ with the minimum row sum for entry $(i_0, j_0)$. On the other hand, in a case that a non-zero entry with a minimum row sum is not found in column $j_L$, the system (i) masks a row having a value $j_L$ and a column having a value $i_0$ to produce a masked transmit/receive matrix, and (ii) determines whether the masked transmit/receive matrix includes an entry $(i_1, j_1)$ which has at least one of a minimum non-zero row sum and a minimum non-zero column sum.

In a case that the masked transmit/receive matrix includes an entry $(i_1, j_1)$ with at least one of a minimum non-zero row sum and a minimum non-zero column sum, the system repeats at least steps (B) through (F) above substituting entry $(i_1, j_1)$ for entry $(i_0, j_0)$. On the other hand, in a case that the masked transmit/receive matrix does not include an entry $(i_1, j_1)$ with at least one of a minimum non-zero row sum and a minimum non-zero column sum, the system (i) unmasks row $j_L$ and column $i_0$ to produce an unmasked transmit/receive matrix, (ii) selects an entry $(i_2, j_2)$ from the unmasked transmit/receive matrix, and (iii) repeats at least steps (B) through (F) above substituting entry $(i_2, j_2)$ for entry $(i_0, j_0)$ and using the unmasked transmit/receive matrix.

By virtue of the foregoing steps, the invention is able to allocate data slots in the CDF so as to produce, in most cases, a maximum of two one-slot transition turnarounds per control data frame. This is a significant advantage over its conventional counterparts, which have heretofore been unable to achieve similar results without the use of algorithms that are significantly more computationally intensive than the foregoing system.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The invention described herein can be implemented on a wireless ATM network having either a base station architecture or an ad-hoc architecture. A description of its use with a wireless ATM network having the ad-hoc architecture shown in FIG. 2 is provided below.

As shown in FIG. 2, wireless ATM network 5 includes, among other things, wired ATM network 6, gateway ("G") 7, and wireless terminals ("WTs") 9 to 12. Wired ATM network 6 comprises a conventional ATM network, which provides for resource sharing and data cell transfer among its various nodes. Gateway 7 is a port which transmits data cells comprised, e.g., of audio and video data, between wired ATM network 6 and WT 9, from which the information is transmitted to the other WTs. The WTs can comprise any type of information transmitting and receiving device including, but not limited to, personal computers, digital telephones, video cameras, digital cameras, and digital televisions/settop boxes. In the network, WTs 9 to 12 and gateway 7 are typically connected to wired ATM network 2 via fiber optic cables or the like; although wireless connections or electrical cables may be used as well. The WTs, on the other hand, are interconnected via wireless media 14, such as an RF link or an IR link.

As is well known, in wireless ATM networks such as that shown in FIG. 2, a single WT may connect to a variety of different WTs. To establish a connection with a second WT, the ATM layer of a first WT performs a call admission control protocol to determine whether conditions exist which support the connection. An example of a call admission control protocol which may be used with the wireless network is described in U.S. patent application Ser. No. 09/107,526, filed Jun. 30, 1998 entitled "Call Admission Control System For Wireless ATM Networks", the contents of which are hereby incorporated by reference into the subject application as if set forth herein in full.

After it is determined that a connection can be supported, the first WT sends the second WT a cell indicating that a connection has been established. Once connections have been established between various WTs, they may exchange data. As described above, data is exchanged between WTs using a CDF, such as that shown in FIG. 3. In the preferred embodiment of the invention, a scheduling routine running on WT 12 (the central controller in this case, or "CC") regulates communications between the various WTs by establishing a transmission sequence for the exchange of data among the various WTs. This transmission sequence is established in the present invention by allocating data slots in the data phase of the CDF to pairs of WTs. As described in more detail below, this allocation is performed by the invention so as to reduce the number of OTTs to a maximum of two in most, if not all, transmission sequences.

In this regard, the invention is preferably implemented by a processor (not shown) on WT 12, which executes code stored in a memory (not shown) on WT 12. In brief, this code comprises process steps to establish a transmission sequence for effecting communications between plural terminals in a wireless network, where the transmission sequence is defined by a control data frame comprised of plural slots, each of which can be allocated for communication between one pair of the plural terminals. The code includes process steps to generate a transmit/receive matrix for the plural terminals in the wireless network. This transmit/receive matrix includes plural rows and plural columns, where each of the plural rows corresponds to a terminal and each of the plural columns corresponds to a same or different terminal. At each row/column nexus, the transmit/receive matrix includes an entry which indicates whether communications are to be effected between a pair of terminals that corresponds thereto. The code also includes process steps to allocate slots in the control data frame to pairs of the plural terminals based on these entries in the transmit/receive matrix.

Figure 4:
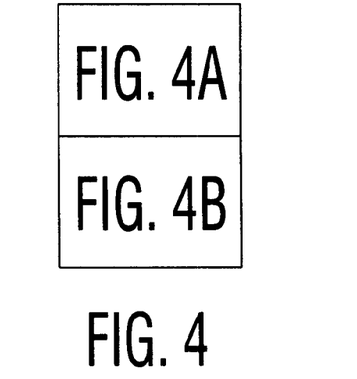
FIG. 4 comprised of FIGS. 4A and 4B, shows process steps for implementing the present invention.
Figure 4A:
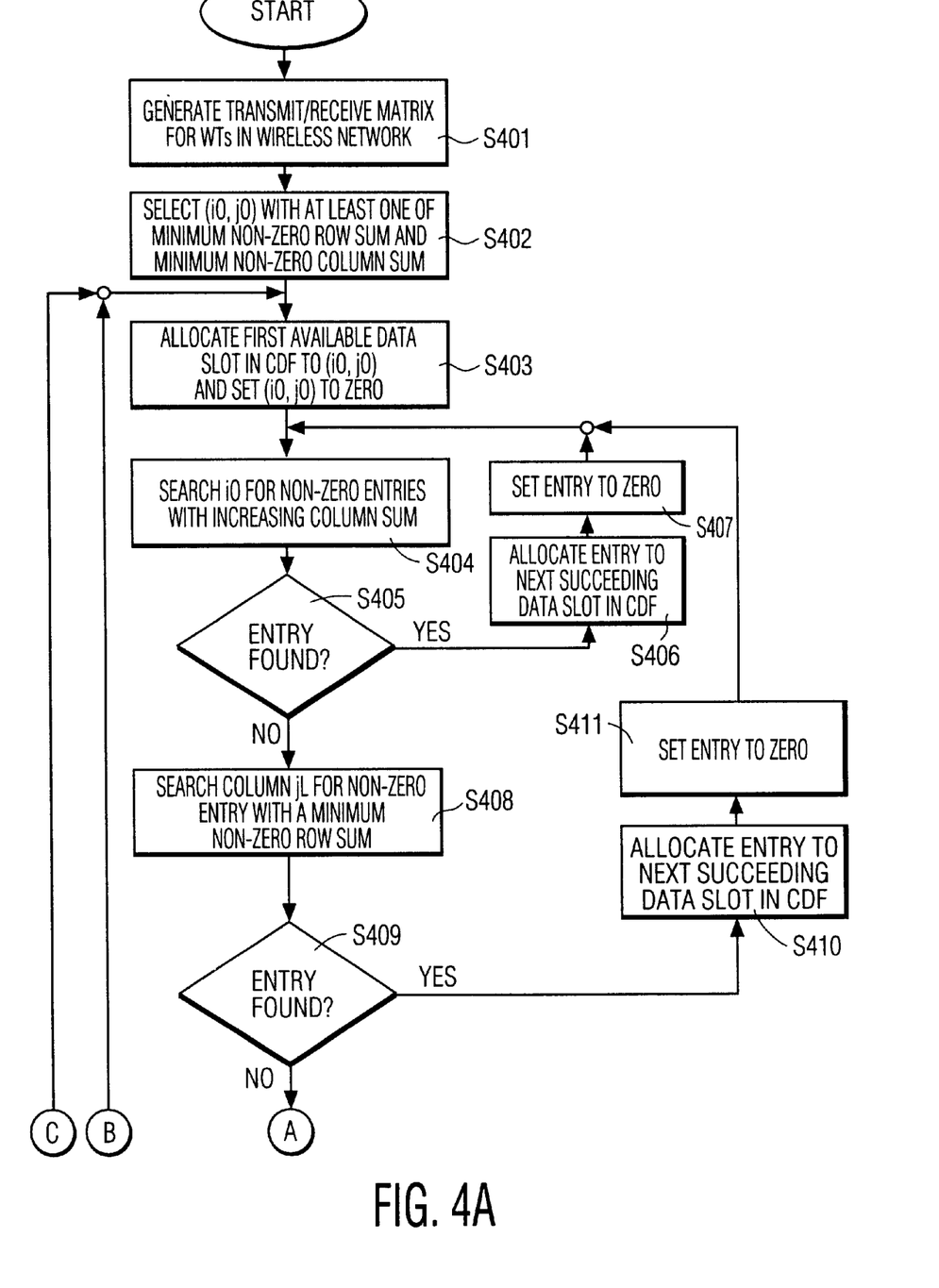
Figure 4B:
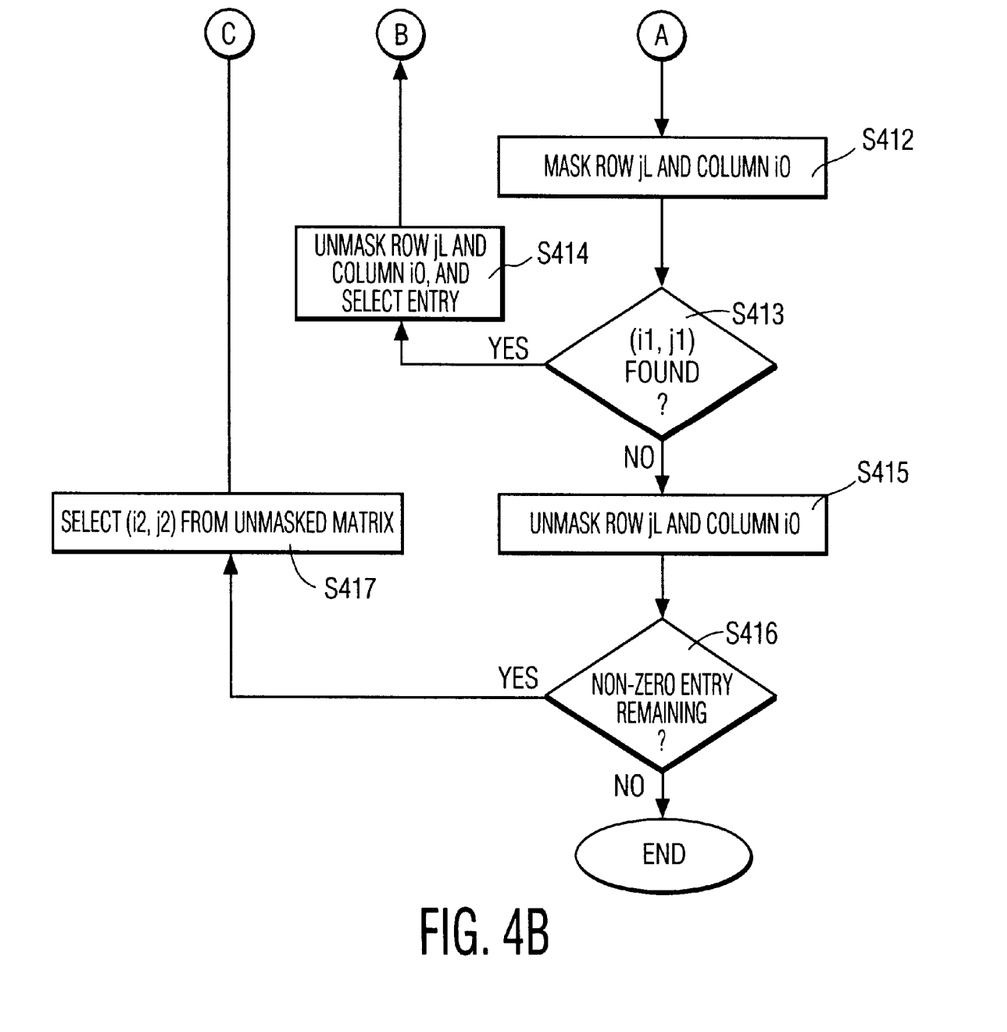
Figure 5:
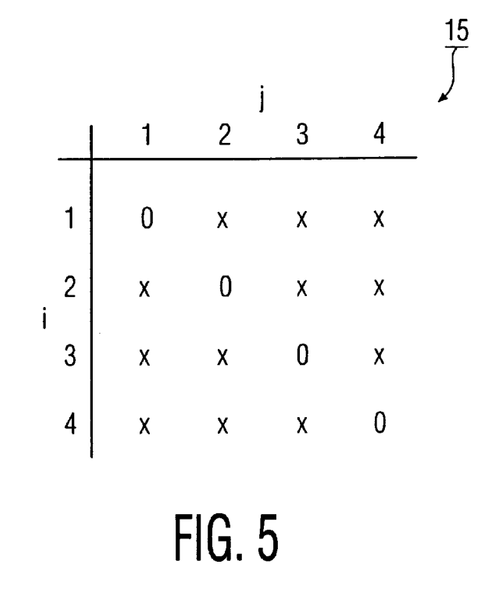
FIG. 5 shows the general layout of a transmit/receive matrix for a four-WT wireless network.

FIG. 4 shows this process in more detail. Pseudo-code therefor is provided in the Appendix attached hereto. To begin, step S401 generates a transmit/receive matrix, referred to as matrix I, for N (N≧2) WTs in a wireless ATM network. Matrix I includes plural rows i (i≧2) and plural columns j (j≧2), as shown in FIG. 5. That is, FIG. 5 shows a transmit/receive matrix for a four-WT wireless network, such as network 5. As shown, matrix 15 includes an entry at each row/column nexus, each entry corresponding to a pair of WTs. These entries indicate whether communications are to be effected between the corresponding pair of WTs. Specifically, in the preferred embodiment, the entries indicate whether data is to be transmitted by a WT in row i (the transmitting WT) to a WT in column j (the receiving WT).

To this end, the entries in matrix 15 take on numerical values which reflect whether such communications are to take place. In the preferred embodiment of the invention, a numerical value of one indicates that communication is to take place, whereas a numerical value of zero indicates that communication is not to take place. Stated mathematically, $$I(i, j) = 1, \text{ for transmission from } i \text{ to } j$$

$$= 0, \text{ for no transmission from } i \text{ to } j.$$

As shown in FIG. 5, in the ad-hoc architecture, where communications may take place directly between two WTs, the diagonal of matrix 15 has all zeros (since the diagonal represents communications between the same WT), and the remaining entries are variable and hence are labeled "x". Variable here means that those entries can take on a value of zero or a value of one, depending upon whether communications are to take place between their WTs. In this regard, it is noted that the invention is not limited to using zeros and ones in matrix 15. Rather, other numerical values may be used by the invention, as desired, so long as a single numerical value indicates "communication", a single numerical value indicates "no communication", and the value indicating "communication" is different from (preferably higher than) the value indicating "no communication".

For two consecutive pairs of WTs $(x_1,y_1)$ and $(x_2,y_2)$ in the transmit/receive matrix, where "x" denotes a transmitting WT and "y" denotes a receiving WT, the invention uses the matrix to determine a transmission sequence ("Seq")

Figure 6:
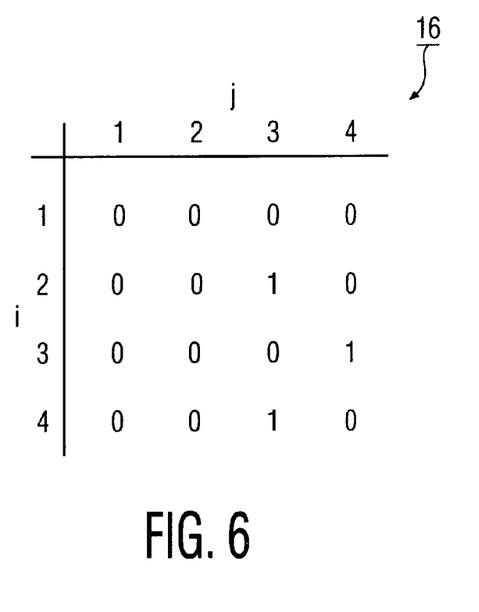
FIGS. 6 to 14 show various stages of a transmit/receive matrix which is processed by the present invention to generate a transmission sequence.

Seq={$(x_1,y_1), (x_2,Y_2)\ldots(x_n,Y_n)$}, such that the number of OTTs is reduced, subject to the constraint that any WT can be in its transmit mode in one continuous period only. For example, with respect to transmit/receive matrix 16 shown in FIG. 6, if the transmission sequence is Seq={(4,3), (3,4), (2,3)}, the number of OTTs (i.e., the cost) will be three, since WT "3" must switch modes twice in adjacent slots (i.e., from (4,3) to (3,4) and from (3,4) to (2,3)) and WT "4" must switch modes once in adjacent slots (i.e., from (4,3) to (3,4)). On the other hand, if the transmission sequence is Seq={(3,4), (2,3), (4,3)}, the number of OTTs will be only one, since WT "3" is the only WT to switch modes in adjacent slots, and since it does so only once (i.e., from (3,4) to (2,3)).

Thus, mathematically speaking, a number of OTTs is defined as follows:

$$f((x_1, y_1) \to (x_2, y_2)) = \begin{cases} 2, & \text{if } x_1 = y_2 \text{ and } y_1 = x_2 \\ 1, & \text{if } x_1 = y_2 \text{ or } y_1 = x_2, \text{ but not both} \\ 0, & \text{if otherwise.} \end{cases}$$

Accordingly, the invention reduces, for most sequences, $$\sum_{i=1}^{n-1} f((x_i, y_i) \to (x_{i+1}, y_{i+1})).$$

To this end, step S402 selects an entry $(i_0, j_0)$ in the transmit/receive matrix, which indicates that communications are to take place between two WTs, and which has at least one of a minimum row sum and a minimum column sum. As noted above, in the preferred embodiment of the invention, an entry of one indicates that communications are to take place, whereas an entry of zero indicates that communications are not to take place. Accordingly, the following describes using a matrix comprised of ones and zeros, such as matrix 17 shown in FIG. 7, even though, as noted above, the invention may use a matrix having other values as well.

Accordingly, step S402 begins by determining the various row and column sums. To determine the row sums, step S402 adds all entries in each row, i, of the matrix. Likewise, to determine the column sums, step S402 adds all entries in each column, j, of the matrix. By way of example, in the transmit/receive matrix shown in FIG. 7, row "1" has a row sum of one, row "2" has a row sum of two, row "3" has a row sum of two, row "4" has a row sum of one, column "1" has a column sum of one, column "2" has a column sum of one, column "3" has a column sum of one, and column "4" has a column sum of three.

Step S402 then selects the entry with the minimum non-zero row sum, unless there are two equal minimum non-zero row sums. In this case, the column sums are used to "break the tie". Specifically, in the case of two or more equal minimum non-zero row sums, the entry having both the minimum row sum and the minimum column sum is selected. If two entries have equal non-zero minimum row sums column sums, either may be selected to begin the process. Of course, although the preferred embodiment gives the row sum precedence in selecting $(i_0, j_0)$, it should be noted that the invention could also be configured to give the column sum precedence. Likewise, $(i_0, j_0)$ could be selected based on a combination (e.g., a sum of) the row sum and column sum.

Next, step S403 allocates a first available data slot in the next CDF to a pair of terminals that corresponds to entry $(i_0, j_0)$. In this regard, the first available data slot in the CDF does not necessarily mean the first slot in the data phase of the CDF. Rather, the first available slot can mean the first slot in the CDF not currently allocated to other WTs, a first available slot in the CDF that has been reserved for communication, etc. Step S403 also sets entry $(i_0, j_0)$ to zero in the transmit/receive matrix. This ensures that two slots will not be allocated for the same entry. Of course, in the case that ones and zeros are not used in the transmit/receive matrix, step S403 will set entry $(i_0, j_0)$ to whatever value is used to indicate that communications are not to be effected between the WTs corresponding to entry $(i_0, j_0)$.

Step S404 then searches row $i_0$ to locate non-zero entries (or, more generally, entries which indicate communication between two WTs) with increasing column sums. Specifically, step S404 searches row $i_0$ for a non-zero entry with a column sum that is closest to, but higher than, that of entry $(i_0, j_0)$. If such an entry is found, processing proceeds from step S405 to step S406. Step S406 allocates (or assigns) that entry to a next succeeding slot in the CDF, whereafter step S407 sets that entry to zero. It is noted that the "next succeeding slot" here refers to a slot adjacent to the first available slot of step S403. Following step S407, processing returns to step S404, where step S404 searches row $i_0$ for a next non-zero entry with a next highest column sum. In this regard, steps S404 to S407 are repeated until all entries in row $i_0$ have values of zero.

At this point, step S408 searches a last column $j_L$ in row $i_0$ for an entry with a minimum non-zero row sum. Column $j_L$ corresponds to a last (hence the subscript "L") non-zero entry in row $i_0$ which has a highest non-zero column sum. In this regard, if there are no entries in row $i_0$, other than $j_0$, which have non-zero values, $j_0$ is searched in step S408. If an entry is found in step S408, processing proceeds from step S409 to step S410, which allocates that entry to a next succeeding slot in the CDF, and thence to step S411 which sets that entry to zero. Following step S411, processing returns to step S404, where the entry found in step S408 is substituted for $(i_0, j_0)$, and the foregoing is repeated.

In a case that a non-zero entry is not found in step S408, processing proceeds through step S409 to step S412. Step S412 masks a row having a value (i.e., a row number) $j_L$ and a column having a value (i.e., a column number) $i_0$ in order to produce a masked transmit/receive matrix. This is done so as to ensure that an entry will not be selected from this row and column and thereby require a WT to switch between modes in adjacent slots—i.e., cause an OTT. Processing then proceeds to step S413.

Step S413 determines whether the masked transmit/receive matrix includes an entry $(i_1, j_1)$ which has a minimum non-zero row sum and, if there are equal minimum non-zero row sums, a minimum non-zero column sum as well. If there are two entries with equal minimum non-zero row and column sums, either may be selected. In a case that the masked transmit/receive matrix includes such an entry $(i_1, j_1)$, processing proceeds to step S414. In that step, the matrix is unmasked and entry $(i_1, j_1)$ is selected and substituted for entry $(i_0, j_0)$. Thereafter, processing returns to step S403, whereafter foregoing steps S403 to S413 are repeated with entry $(i_1, j_1)$ taking the place of entry $(i_0, j_0)$.

In a case that the masked transmit/receive matrix does not include an entry $(i_1, j_1)$, processing proceeds from step S413 to S415. Step S415 unmasks row $j_L$ and column $i_0$. Next, step S416 determines if there are non-zero entries in the resulting matrix. If there are, processing proceeds to step S417. Step S417 selects an entry $(i_2, j_2)$ which has a minimum non-zero row sum and, if necessary, a minimum non-zero column sum, and then substitutes $(i_2, j_2)$ for $(i_0, j_0)$. If possible, step S417 will not select, as entry $(i_2, j_2)$, an entry having a row value of $j_L$ and a column value of $i_0$, since to do so could result in two OTTs. Of course, if this is the only entry left, it must be selected. In any case, once step S417 selects entry $(i_2, j_2)$, foregoing process steps S403 to S416 are repeated for entry $(i_2, j_2)$. When the process finally determines that the entire matrix has values of zero, processing proceeds from S416 to end.

With respect to the matrix shown in FIG. 7, the process shown in FIG. 4 works as follows. Specifically, entries (1,4) and (4,3) have minimum row sums of one. Accordingly step S402 looks to columns sums. Here, (4,3) has a smaller column sum than (1,4). Accordingly, step S402 selects (4,3).

Figure 8:
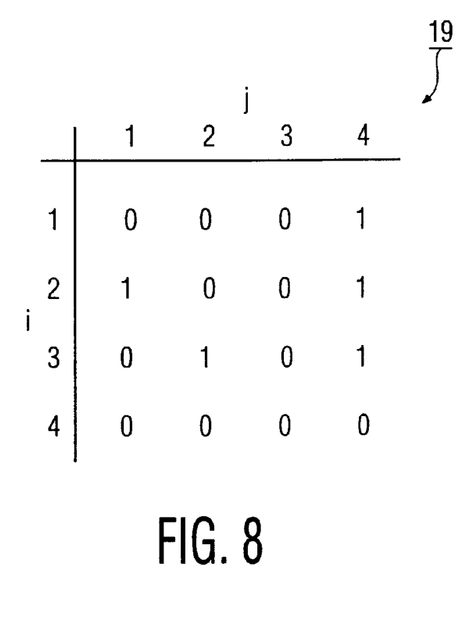

Step S403 thus allocates (4,3) to the first available slot in the CDF and sets that entry to zero, resulting in matrix 19 shown in FIG. 8. Next step S404 searches row "4" (i.e., $i_0$) of matrix 19 for non-zero entries with increasing column sums. In this example, there are no other non-zero entries in row "4". Therefore, processing proceeds through step S405 to step S408. Step S408 searches column $j_L$ for a non-zero entry with the lowest row sum. Here, column "3" is used as $j_L$ since there are no other non-zero entries in row "4"; hence column "3" is the "last" non-zero entry in row "1". In column "3", there are no non-zero entries. Accordingly, processing proceeds through step S409 to step S412.

Figure 9:
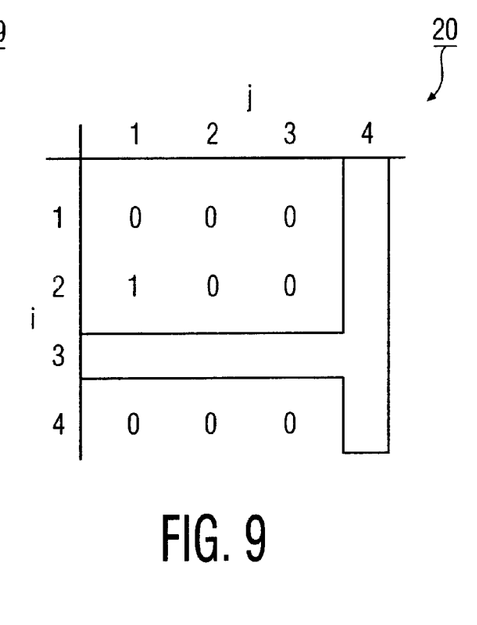

Step S412 masks row "3" and column "4", resulting in matrix 20 shown in FIG. 9. Step S413 determines whether the masked transmit/receive matrix shown in FIG. 9 includes an entry $(i_1,j_1)$ which has a minimum non-zero row sum and, if there are equal minimum non-zero row sums, a minimum non-zero column sum as well. Here, entry (2,1) is the only non-zero entry and, thus by definition has the minimum non-zero row and column sum (since the masked values are not counted). Therefore, step S414 selects (2,1) and substitutes (2,1) for $(i_0,j_0)$, unmasks matrix 20 (to produce matrix 19), and returns to step S403.

Figure 10:
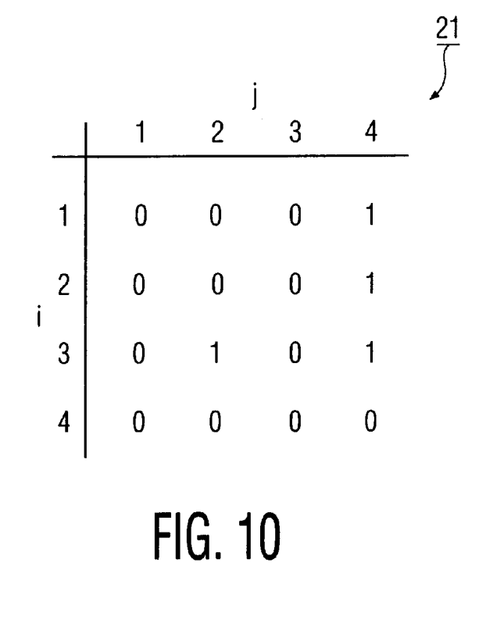
Figure 11:
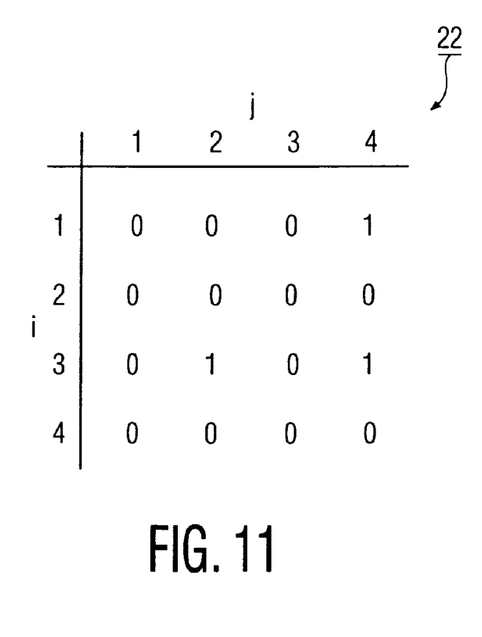
Figure 12:
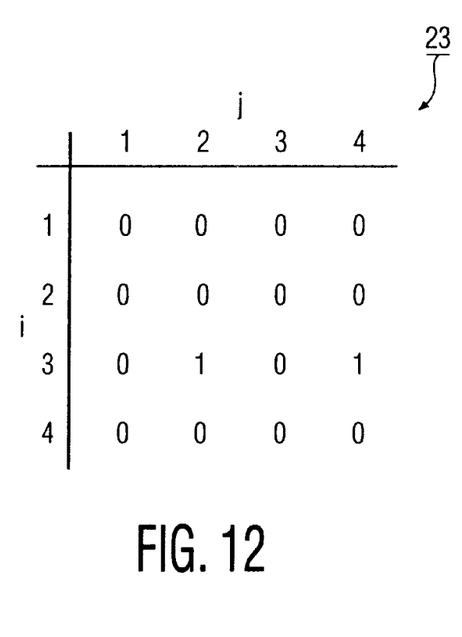
Figure 13:
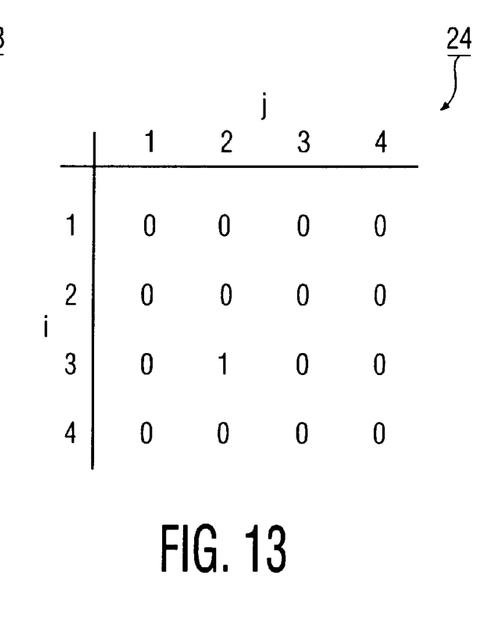
Figure 14:
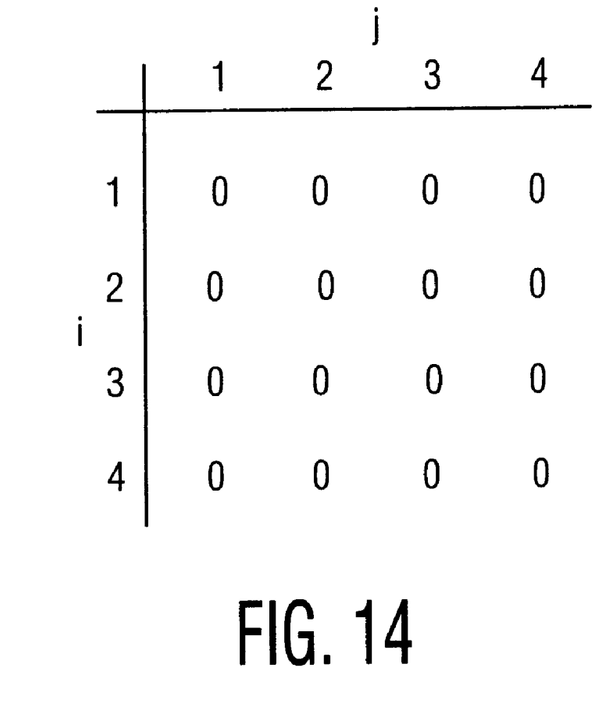

Step S403 allocates the next slot in the CDF to (2,1), and sets that value to zero, resulting in matrix 21 shown in FIG. 10. Step S404 then searches row "2" (i.e., $i_0$) for remaining non-zero entries with increasing column sum. Here, the only remaining entry in row "2" is (2,4). Accordingly, processing proceeds to step S405, where that entry is allocated to the CDF, and thence to step S407, where it is set to zero resulting in matrix 22 shown in FIG. 11. Processing then returns to step S404. Thereafter processing proceeds through step S404 using matrix 22 shown in FIG. 12. In that matrix, entry (1,4) has the lowest row sum. Accordingly (1,4) is allocated to the CDF in step S406, thereby producing matrix 23 shown in FIG. 12. Thereafter, processing proceeds along column "4", resulting in allocation of (3,4), and producing matrix 24 shown in FIG. 13. Processing then allocates this last non-zero entry, resulting in the "0" identity matrix shown in FIG. 14.

Thereafter, processing ends.

Figure 7:
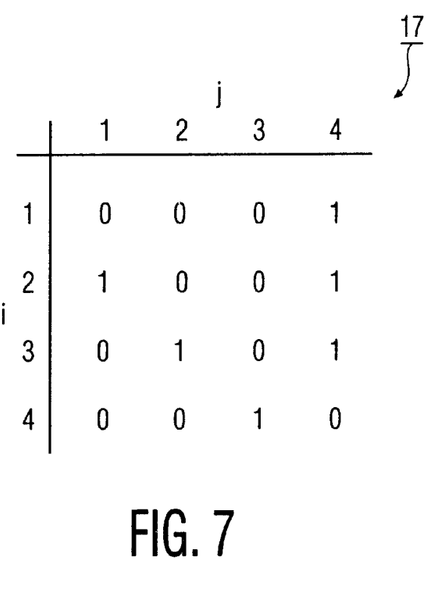

Accordingly, for original matrix 17 shown in FIG. 7, the process shown in FIG. 4 produces the following sequence Seq={(4,3), (2,1), (2,4), (1,4), (3,4), (3,2)}.

Thus, in this case, the process generated a sequence having no OTTs.

In this regard, generally speaking, the present invention will establish a transmission sequence having at most two OTTs (i.e., a cost of two). By way of example, if after step S417, there is more than one entry remaining and $I(j_L,i_0)=0$, the cost will increase by one, but not more than two. For instance, if only two entries $(j_L,k)$ and $(k,i_0)$ remain, then $(i_0,j_L)$ to $(j_L,k)$ will incur a cost of one, and $(j_L,k)$ and $(k,i_0)$ will also incur a cost of one, resulting in a total cost of two. Likewise, if more than two entries remain following step S417, such as entries $(j_L,k)$, $(k,i_0)$, and $(m,i_0)$, then $(i_0,j_L)$ to $(j_L,k)$ will incur a cost of one. The invention can then mask row k and select $(m,i_0)$ without incurring additional cost. Thereafter, the invention unmasks row k and selects entry $(k,i_0)$ also without incurring additional cost. Thus, in this case, the total cost incurred is one.

On the other hand, if after step S417 there is more than one entry left and $I(j_L,i_0)\neq0$, the cost will increase by only one. For instance, if there are three entries $(j_L,k)$, $(k,i_0)$, and $(j_L,i_0)$ remaining, and if $(k,i_0)$ is selected first, $(i_0,j_L)$ to $(k,i_0)$ will incur a cost of one. Assuming the invention then selects $(j_L,i_0)$, no additional cost will be incurred. Finally, $(j_L,k)$ can be selected without incurring additional cost, leaving the total cost at one.

Finally, if $(j_L,i_0)$ is the only entry remaining following step S417, the total cost incurred will be exactly two as a result of the $(i_0,j_L)$ to $(j_L,i_0)$ transition. The invention, however, provides a way to reduce this cost in particular, as well as other costs which may be incurred. More specifically, to reduce cost, the invention may move $(j_L,i_0)$ up in the transmission sequence so that it occupies a previous slot in the CDF. For example, entry $(j_L,i_0)$ may be moved/allocated to an initial (e.g., first available) slot in the CDF. Other entries which increase cost may be similarly moved, so long as those moves themselves do not increase the cost.

The foregoing describes the invention in the context of an ad-hoc configured wireless ATM network. As noted above, however, the invention may also be used in the context of a base-station configured wireless ATM network. FIG. 1 shows an example of such a network. More specifically, wireless ATM network 27 shown in FIG. 1 has a centralized, or base station, architecture and a star topology. As shown, wireless ATM network 27 includes, among other things, wired ATM network 29, gateway ("G") 30, base stations ("BS") 31, 32 and 33, and wireless terminals ("WT") 34. Wired ATM network 27 and gateway 30 are similar to those described above. Base station 32 directs data cells received from gateway 30 to appropriate one(s) of base stations 31 and 33 based on network addresses in the cell headers, and passes data cells received from base stations 31 and 33 back through to gateway 30. Base stations 31 and 33, which preferably comprise transmitters or the like within a predetermined proximity of their respective WTs, transmit and receive data from WTs with which they have an established connection. Base stations 31 to 33 and gateway 30 are typically connected to wired ATM network 29 via fiber optic cables or the like; although wireless connections or electrical cables may be used as well. WTs 34, on the other hand, are connected to base stations 31 and 33 via wireless media 40, such as an RF link or an IR link.

In this regard, as is well known, in wireless ATM networks such as that shown in FIG. 1, there may be one or more connections between a single base station and a single network device; that is, one connection for each application running on the WT. Once such connections are established, as described in U.S. patent application Ser. No. 09/107,526, incorporated by reference above, the base station can communicate with WTs. Unlike in the ad-hoc architecture shown in FIG. 2, in the base station architecture, the WTs do not communicate directly with each other. Rather, all communications are routed through the base stations.

Figure 15:
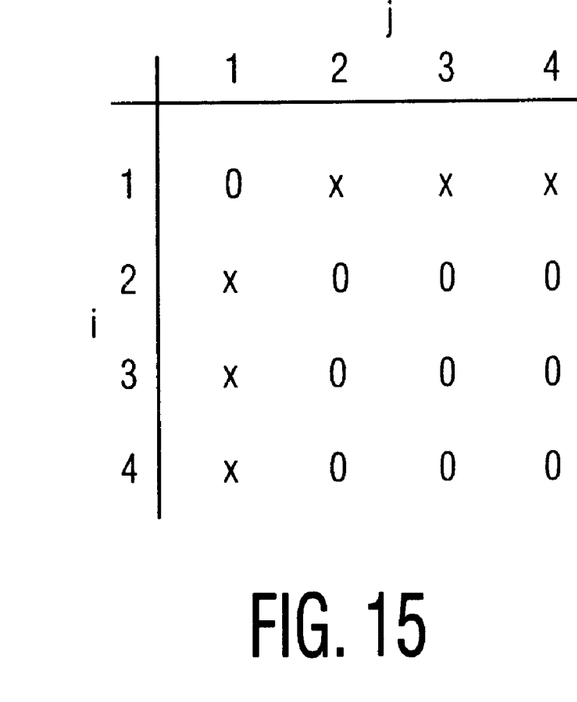
FIG. 15 shows the general layout of a transmit/receive matrix for a wireless network having one base station and three WTs.
Figure 16:
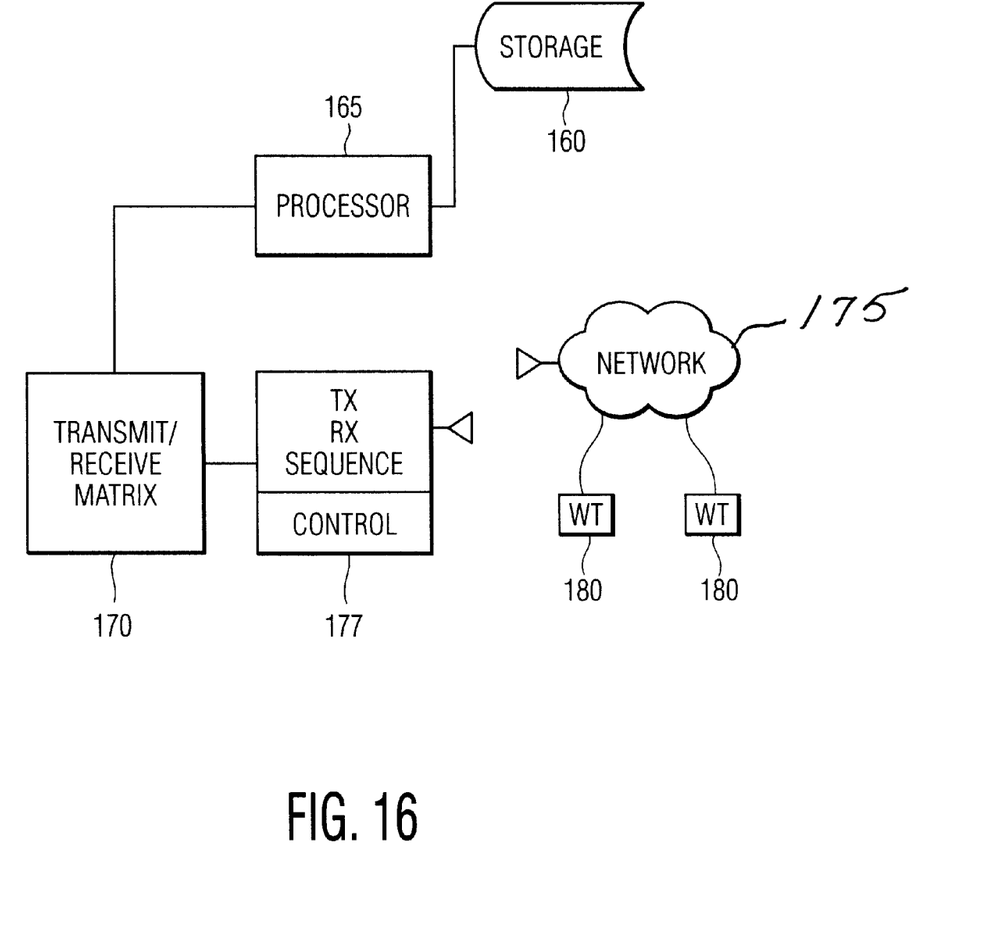

Thus, a transmit/receive matrix for the base station architecture, where "1" is the base station, is as shown in FIG. 15. In matrix 41, only entries in the first row and first column (except for (1,1)) are variable. All other entries are zero, since each WT is limited to communicating with one base station. Once a matrix such as that shown in FIG. 15 is established in step S401, processing in FIG. 4 proceeds to step S402. Since the remaining processing is identical to that described above, a description thereof has been omitted here in the interests of brevity.

In addition to using the invention on networks having different architectures, the invention can also be used on networks where the guard time of each WT varies. In this regard, the guard time comprises the time gap between transmitting and receiving data in a single terminal. In this case, the central controller/base station should inform the WTs of the time of a scheduled transmission as well as the current value of the guard time.

Moreover, the system of FIG. 4 may be combined with a back tracking technique, such as the branch and bound method, in order to provide for even further reduced cost. Of course, this is generally only practical in cases where there are a relatively small number of WTs in the network. It is also noted that although the invention is described herein in the context of an ATM network having four WTs, the invention can be utilized with any wireless network protocol that transmits data in CDFs or their equivalent, and with any number of WTs. Finally it noted that the process steps shown in FIG. 4 need not necessarily be executed in the exact order shown, and that the order shown is merely one way for the invention to operate. Thus, other orders of execution are permissible, so long as the functionality of the invention is substantially maintained.

In this regard, the present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

APPENDIX

```
/* The following comprises pseudo-code for implementing the preferred
/* embodiment of the present invention.
/* I comprises a non-zero transmit/receive matrix
/* Seq comprises a resulting transmission sequence determined using
matrix I
/* START
/* Initialization
set column_flag=0, mask_flag=0, and shuffle_flag=0
/* Step 1: Row-wise search
if column_flag = 0, then find row i such that row-sum is
non-zero minimum
if column_flag = 1, then find row i such that
    for all non-zero entries in column j, row-sum of row i is non-zero
    minimum, then save (i,j) in Seq and update I by setting I(i,j)=0 and
    reset column_flag
/* Step 2: Column-wise search for row i with i found in the row-wise
search
find column j in row i such that, for all non-zero entries in row i,
column-sum of column j is non-zero minimum
/* Step 3
save (i,j) in Seq and update I by setting I(i,j)=0
in a case that mask-flag of I is non-zero, unmask I and reset mask-flag
/* Step 4
repeat steps 2 and 3 for all non-zero columns in row i
/* Step 5
for a last column j_L found in step 4, check whether there are still non-zero
entries in column j_L in I
    if yes, set column_flag 1, and goto step 1
    if no, then find another pair (i_1,j_1) such that an incremental cost is
    minimum
        mask row j and column i and set mask_flag = 1
        if all entries in masked I are zero then
            unmask I and reset mask_flag = 0
            if I(j,i) is not the only non-zero entry in row j and
            column i, then
                mask I(j,i) and set mask_flag = 1
            else
                since I(j,i) is the only element left, the cost will
                be increased by two, set shuffle_flag so that a last
                entry (j,i) in Seq becomes the first entry in Seq
/* Step 6
repeat steps 1 to 5 until all entries in 1 are zero
/* Step 7
if shuffle_flag is non-zero, move the last entry in Seq to the first
entry in Seq
/* Step 8
evaluate the cost of transmission sequence Seq
/* Step 9
print results and exit
/* END
```

What is claimed is:

1. A method of establishing a transmission sequence for effecting communications between plural terminals in a wireless network, where the transmission sequence is defined by a control data frame comprised of plural slots, each of which can be allocated for communication between one pair of the plural terminals, the method comprising the steps of:

generating a transmit/receive matrix for the plural terminals in the wireless network, the transmit/receive matrix comprising plural rows and plural columns, each of the plural rows corresponding to a terminal and each of the plural columns corresponding to a terminal, the transmit/receive matrix including an entry at each row/column nexus, each entry indicating whether communications are to be effected between a pair of the terminals that corresponds to the entry; and allocating slots in the control data frame for communication between pairs of the plural terminals based on the entries in the transmit/receive matrix.

2. A method according to claim 1, wherein the entries in the transmit/receive matrix comprise numerical values; and wherein the allocating step comprises allocating the slots in the control data frame based on sums of the numerical values in rows and columns of the transmit/receive matrix.

3. A method according to claim 2, wherein entries in the transmit/receive matrix which indicate that communications are to be effected between a pair of the terminals have higher numerical values than entries which indicate that communications are not to be effected between a pair of terminals; and wherein the allocating step comprises:

locating a first entry in the transmit/receive matrix which indicates that communications are to be effected between a pair of the terminals and which has at least one of a minimum row sum and a minimum column sum;

a first assigning step for assigning a slot in the control data frame to a pair of the plural terminals that corresponds to the first entry; and a second assigning step for assigning succeeding slots in the control data frame to at least some remaining pairs of the plural terminals based on row sums and column sums for the remaining entries in the transmit/receive matrix.

4. A method according to claim 3, wherein the first entry in the transmit/receive matrix comprises an entry ($i_0$ $j_0$) where "i" represents a row number and "j" represents a column number in the transmit/receive matrix; and wherein the second assigning step comprises:

search row $i_0$ for additional entries other than the first entry which indicate that communications are to be effected between a pair of the terminals, and which have increasing column sums; and assigning succeeding slots in the control data frame to pairs of terminals having entries in row $i_0$ which indicate that communications are to be effected between a pair of the terminals, and which have increasing column sums.

5. A method according to claim 4, wherein, once the searching step reaches a column $j_L$ in row $i_0$, where $j_L$ corresponds to a column of a last entry in row $i_0$ which indicates that communications are to be effected between a pair of the terminals; the second assigning step further comprises the steps of:

searching column $j_L$ for an entry which indicates that communications are to be effected between a pair of the terminals, and which has a minimum row sum; and assigning a next succeeding slot in the control data frame to a pair of terminals having an entry in column $j_L$ which indicates that communications are to be effected between a pair of the terminals, and which has a minimum row sum.

6. A method according to claim 5, wherein after each of the first and second assigning steps assigns a slot in the control data frame to a pair of plural terminals, the method further comprises the step of changing a value of an entry in the transmit/receive matrix for the pair of plural terminals to a numerical value which indicates that communications are not to be effected between the pair of the terminals.

7. A method according to claim 6, wherein, in a case that there is no remaining entry in column $j_L$ which indicates that communications are to be effected between a pair of the terminals, the second assigning step further comprises the steps of:

masking a row having a value $j_L$ and a column having a value $i_0$ so as to produce a masked transmit/receive matrix;

locating a first entry $(i_1,j_1)$ in the masked transmit/receive matrix which indicates that communications are to be effected between a pair of the terminals and which has at least one of a minimum row sum and a minimum column sum;

assigning a next succeeding slot in the control data frame to a pair of the plural terminals that corresponds to the first entry $(i_1,j_1)$; and assigning next succeeding slots in the control data frame to at least some remaining pairs of the plural terminals based on row sums and column sums for the remaining entries in the masked transmit/receive matrix.

8. A method according to claim 7, wherein, in a case that the entry $(i_1,j_1)$ cannot be located, the second assigning step further comprises the steps of:

unmasking row $j_L$ and column $i_0$ so as to produce an unmasked transmit/receive matrix;

locating an entry $(i_2,j_2)$ in the unmasked transmit/receive matrix which indicates that communications are to be effected between a pair of the terminals and which has at least one of a minimum row sum and a minimum column sum;

selecting entry $(i_2,j_2)$ in the unmasked transmit/receive matrix;

assigning a next succeeding slot in the control data frame to a pair of the plural terminals that corresponds to the entry $(i_2,j_2)$; and assigning next succeeding slots in the control data frame to at least some remaining pairs of the plural terminals based on row sums and column sums for the remaining entries in the unmasked transmit/receive matrix.

9. A method according to claim 8, wherein the selecting step selects an entry $(i_2,j_2)$ which is different from an entry at row $j_L$ and column $i_0$ in the unmasked transmit/receive matrix.

10. A method according to claim 1, wherein the allocating step allocates slots in the control data frame so as to produce a maximum of two one-slot transition turnarounds per control data frame.

11. Computer-executable process steps stored on a computer-readable medium, the computer-executable process steps to establish a transmission sequence for effecting communications between plural terminals in a wireless network, where the transmission sequence is defined by a control data frame comprised of plural slots, each of which can be allocated for communication between one pair of the plural terminals, the computer-executable process steps comprising:

code to generate a transmit/receive matrix for the plural terminals in the wireless network, the transmit/receive matrix comprising plural rows and plural columns, each of the plural rows corresponding to a terminal and each of the plural columns corresponding to a terminal, the transmit/receive matrix including an entry at each row/column nexus, each entry indicating whether communications are to be effected between a pair of the terminals that corresponds to the entry; and code to allocate slots in the control data frame for communication between pairs of the plural terminals based on the entries in the transmit/receive matrix.

12. Computer-executable process steps according to claim 11, wherein the entries in the transmit/receive matrix comprise numerical values; and wherein the allocating code allocates the slots in the control data frame based on sums of the numerical values in rows and columns of the transmit/receive matrix.

13. Computer-executable process steps according to claim 12, wherein entries in the transmit/receive matrix which indicate that communications are to be effected between a pair of the terminals have higher numerical values than entries which indicate that communications are not to be effected between a pair of terminals; and wherein the allocating code comprises:
code to locate a first entry in the transmit/receive matrix which indicates that communications are to be effected between a pair of the terminals and which has at least one of a minimum row sum and a minimum column sum;

first assigning code to assign a slot in the control data frame to a pair of the plural terminals that corresponds to the first entry; and second assigning code to assign succeeding slots in the control data frame to at least some remaining pairs of the plural terminals based on row sums and column sums for the remaining entries in the transmit/receive matrix.

14. Computer-executable process steps according to claim 13, wherein the first entry in the transmit/receive matrix comprises an entry $(i_0, j_0)$ where "i" represents a row number and "j" represents a column number in the transmit/receive matrix; and wherein the second assigning code comprises:
code to search row $i_0$ for additional entries other than the first entry which indicate that communications are to be effected between a pair of the terminals, and which have increasing column sums; and code to assign succeeding slots in the control data frame to pairs of terminals having entries in row $i_0$ which indicate that communications are to be effected between a pair of the terminals, and which have increasing column sums.

15. Computer-executable process steps according to claim 14, wherein the second assigning code further comprises:

code to search a column $j_L$ in row $i_0$ for an entry which indicates that communications are to be effected between a pair of the terminals, and which has a minimum row sum, where $j_L$ corresponds to a column of a last entry in row $i_0$ which indicates that communications are to be effected between a pair of the terminals; and code to assign a next succeeding slot in the control data frame to a pair of terminals that has an entry in column $j_L$ which indicates that communications are to be effected between a pair of the terminals, and which has a minimum row sum.

16. Computer-executable process steps according to claim 15, further comprising code, which is executable after each of the first and second assigning code, to change a value of an entry in the transmit/receive matrix for a pair of plural terminals to a numerical value which indicates that communications are not to be effected between the pair of the terminals.

17. Computer-executable process steps according to claim 16, wherein the second assigning code further comprises:

code to mask a row having a value $j_L$ and a column having a value $i_0$ so as to produce a masked transmit/receive matrix;

code to locate a first entry $(i_1,j_1)$ in the masked transmit/receive matrix which indicates that communications are to be effected between a pair of the terminals, and which has at least one of a minimum row sum and a minimum column sum;

code to assign a next succeeding slot in the control data frame to a pair of the plural terminals that corresponds to the first entry $(i_1,j_1)$; and code to assign next succeeding slots in the control data frame to at least some remaining pairs of the plural terminals based on row sums and column sums for the remaining entries in the masked transmit/receive matrix.

18. Computer-executable process steps according to claim 17, further comprising:

code to unmask row $j_L$ and column $i_0$ so as to produce an unmasked transmit/receive matrix in a case that the entry $(i_1,j_1)$ cannot be located;

code to locate an entry $(i_2,j_2)$ in the unmasked transmit/receive matrix which indicates that communications are to be effected between a pair of the terminals and which has both a minimum row sum and a minimum column sum;

code to select entry $(i_2,j_2)$ in the unmasked transmit/receive matrix;

code to assign a next succeeding slot in the control data frame to a pair of the plural terminals that corresponds to the entry $(i_2,j_2)$; and code to assign next succeeding slots in the control data frame to at least some remaining pairs of the plural terminals based on row sums and column sums for the remaining entries in the unmasked transmit/receive matrix.

19. Computer-executable process steps according to claim 18, wherein the selecting code selects an entry $(i_2,j_2)$ which is different from an entry at row $j_L$ and column $i_0$ in the unmasked transmit/receive matrix.

20. Computer-executable process steps according to claim 11, wherein the allocating code allocates slots in the control data frame so as to produce a maximum of two one-slot transition turnarounds per control data frame.

21. An apparatus for establishing a transmission sequence for effecting communications between plural terminals in a wireless network, where the transmission sequence is defined by a control data frame comprised of plural slots, each of which can be allocated for communication between one pair of the plural terminals, the apparatus comprising:

a memory which stores computer-executable process steps; and a processor which executes the process steps so as to (A) generate a transmit/receive matrix for the plural terminals in the wireless network, the transmit/receive matrix comprising plural rows and plural columns, each of the plural rows corresponding to a terminal and each of the plural columns corresponding to a terminal, the transmit/receive matrix including an entry at each row/column nexus, each entry indicating whether communications are to be effected between a pair of the terminals that corresponds to the entry, and (B) to allocate slots in the control data frame for communication between pairs of the plural terminals based on the entries in the transmit/receive matrix.

22. An apparatus according to claim 21, wherein the entries in the transmit/receive matrix comprise numerical values; and wherein the processor allocates the slots in the control data frame based on sums of the numerical values in rows and columns of the transmit/receive matrix.

23. An apparatus according to claim 22, wherein entries in the transmit/receive matrix which indicate that communications are to be effected between a pair of the terminals have higher numerical values than entries which indicate that communications are not to be effected between a pair of terminals; and wherein the processor allocates the slots in the control data frame by (A) locating a first entry in the transmit/receive matrix which indicates that communications are to be effected between a pair of the terminals and which has at least one of a minimum row sum and a minimum column sum, (B) assigning a slot in the control data frame to a pair of the plural terminals that corresponds to the first entry, and (C) assigning succeeding slots in the control data frame to at least some remaining pairs of the plural terminals based on row sums and column sums for the remaining entries in the transmit/receive matrix.

24. An apparatus according to claim 23, wherein the first entry in the transmit/receive matrix comprises an entry $(i_0,j_0)$ where "i" represents a row number and "j" represents a column number in the transmit/receive matrix; and wherein the processor assigns succeeding slots in the control data frame by (A) searching row $i_0$ for additional entries other than the first entry which indicate that communications are to be effected between a pair of the terminals, and which have increasing column sums; and (B) assigning succeeding slots in the control data frame to pairs of terminals having entries in row $i_0$ which indicate that communications are to be effected between a pair of the terminals, and which have increasing column sums.

25. An apparatus according to claim 24, wherein, once the processor reaches a column $j_L$ in row $i_0$, where $j_L$ corresponds to a column of a last entry in row $i_0$ which indicates that communications are to be effected between a pair of the terminals, the processor further executes process steps so as (A) to search column $j_L$ for an entry which indicates that communications are to be effected between a pair of the terminals, and which has a minimum row sum, and (B) to assign next a succeeding slot in the control data frame to a pair of terminals that has an entry in column $j_L$ which indicates that communications are to be effected between a pair of the terminals, and which has a minimum row sum.

26. An apparatus according to claim 25, wherein after (A) assigning a slot in the control data frame to a pair of the plural terminals that corresponds to the first entry, and (B) assigning succeeding slots in the control data frame, the processor executes process steps so as to change a value of an entry in the transmit/receive matrix, for each pair of plural terminals that has been assigned, to a numerical value which indicates that communications are not to be effected between the pair of the terminals.

27. An apparatus according to claim 26, wherein, in a case that there are no remaining entries in column $j_L$ which indicate that communications are to be effected between a pair of the terminals, the processor further executes process steps so as (A) to mask a row having a value $j_L$ and a column having a value $i_0$ so as to produce a masked transmit/receive matrix, (B) to locate a first entry $(i_1,j_1)$ in the masked transmit/receive matrix which indicates that communications are to be effected between a pair of the terminals and which has at least one of a minimum row sum and a minimum column sum, (C) to assign a next succeeding slot in the control data frame to a pair of the plural terminals that corresponds to the first entry $(i_1,j_1)$, and (D) to assign next succeeding slots in the control data frame to at least some remaining pairs of the plural terminals based on row sums and column sums for the remaining entries in the masked transmit/receive matrix.

28. An apparatus according to claim 27, wherein, in a case that the entry $(i_1,j_1)$ cannot be located, the processor executes process steps so as (A) to unmask row $j_L$ and column $i_0$ so as to produce an unmasked transmit/receive matrix, (B) to locate an entry $(i_2,j_2)$ in the unmasked transmit/receive matrix which indicates that communications are to be effected between a pair of the terminals and which has at least one of a minimum row sum and a minimum column sum, (C) to select the entry $(i_2,j_2)$ in the unmasked transmit/receive matrix, (D) to assign a next succeeding slot in the control data frame to a pair of the plural terminals that corresponds to the entry $(i_2,j_2)$, and (E) to assign next succeeding slots in the control data frame to at least some remaining pairs of the plural terminals based on row sums and column sums for the remaining entries in the unmasked transmit/receive matrix.

29. An apparatus according to claim 28, wherein the processor selects an entry $(i_2,j_2)$ which is different from an entry at row $j_L$ and column $i_0$ in the unmasked transmit/receive matrix.

30. An apparatus according to claim 21, wherein the processor allocates slots in the control data frame so as to produce a maximum of two one-slot transition turnarounds per control data frame.

31. An apparatus according to claim 21, wherein the terminals comprise wireless terminals of an ATM network.

32. An apparatus according to claim 31, wherein the apparatus is a personal computer.

33. An apparatus according to claim 31, wherein the apparatus is a digital television.

34. A method of using a transmit/receive matrix to allocate data slots in a control data frame to pairs of terminals, where the transmit/receive matrix is comprised of plural rows and plural columns, each of the plural rows corresponding to a terminal and each of the plural columns corresponding to a terminal, the transmit/receive matrix including an entry at each row/column nexus, each entry comprising either a one to indicate that communications are to be effected between a pair of the terminals that corresponds to the entry or a zero to indicate that communications are not to be effected between a pair of terminals that corresponds to the entry, the method comprising the steps of:

(A) selecting an entry $(i_0,j_0)$ in the transmit/receive matrix which has at least one of a minimum non-zero row sum and a minimum non-zero column sum, where "i" represents a row number and "j" represents a column number;

(B) allocating a first available data slot in the control data frame to a pair of terminals that corresponds to entry $(i_0,j_0)$ in the transmit/receive matrix;

(C) searching row $i_0$ for non-zero entries with increasing column sums;

(D) allocating succeeding data slots in the control data frame to pairs of terminals that have non-zero entries in row $i_0$ with increasing column sums;

(E) setting, to zero, non-zero entries in row $i_0$;

(F) searching column $j_L$ for a non-zero entry with a minimum row sum, where column $j_L$ comprises a last column in row $i_0$ having a highest non-zero column sum;

wherein, in a case that a non-zero entry with a minimum row sum is found in column $j_L$ the method further comprises (i) allocating a next succeeding data slot in the control data frame to a pair of terminals that has a non-zero entry in column $j_L$ with a minimum row sum, (ii) setting, to zero, the non-zero entry in column $j_L$ with the minimum row sum, and (iii) repeating at least steps (B) through (F) substituting the non-zero entry in column $j_L$ with the minimum row sum for entry $(i_0,j_0)$;

wherein, in a case that a non-zero entry with a minimum row sum is not found in column $j_L$ the method further comprises (i) masking a row having a value $j_L$ and a column having a value $i_0$ to produce a masked transmit/receive matrix, and (ii) determining whether the masked transmit/receive matrix includes an entry $(i_1,j_1)$ which has at least one of a minimum non-zero row sum and a minimum non-zero column sum;

wherein, in a case that the masked transmit/receive matrix includes an entry $(i_1,j_1)$ with at least one of a minimum non-zero row sum and a minimum non-zero column sum, the method further comprises repeating at least steps (B) through (F) substituting entry $(i_1,j_1)$ for entry $(i_0,j_0)$; and wherein, in a case that the masked transmit/receive matrix does not include an entry $(i_1,j_1)$ with at least one of a minimum non-zero row sum and a minimum non-zero column sum, the method further comprises (i) unmasking row $j_L$ and column $i_0$ to produce an unmasked transmit/receive matrix, (ii) selecting an entry $(i_2,j_2)$ from the unmasked transmit/receive matrix, and (iii) repeating at least steps (B) through (F) substituting entry $(i_2,j_2)$ for entry $(i_0,j_0)$ and using the unmasked transmit/receive matrix.

35. A method according to claim 34, wherein the selecting step selects an entry $(i_2,j_2)$ which is different from an entry at row $j_L$ and column $i_0$ in the unmasked transmit/receive matrix.

36. A method according to claim 34, herein in a case that the selecting step selects, as entry $(i_2,j_2)$, an entry at row $j_L$ and column $i_0$ in the unmasked transmit/receive matrix, the allocating step (step (B)) allocates an initial data slot in the control data frame to a pair of terminals that corresponds to entry $(i_2,j_2)$.

37. A method according to claim 34, wherein steps (A) through (F) allocate data slots in the control data frame so as to produce a maximum of two one-slot transition turnarounds per control data frame.

38. A method according to claim 34, wherein the terminals comprise wireless terminals of an ATM network.

* * * * *